United States Patent [19]

Miyagawa et al.

[11] Patent Number: 5,389,976
[45] Date of Patent: Feb. 14, 1995

[54] AUDIO VIDEO EQUIPMENT INCLUDING NON-VOLATILE MEMORY MEANS AND METHODS FOR PRODUCING THE SAME

[75] Inventors: Hitoshi Miyagawa, Saitama; Koji Takeda, Kanagawa, both of Japan

[73] Assignee: Sony Corporation, Tokyo, Japan

[21] Appl. No.: 101,762

[22] Filed: Aug. 4, 1993

[30] Foreign Application Priority Data

Aug. 20, 1992 [JP] Japan .................. 4-242531

[51] Int. Cl.⁶ .......................... H04N 5/44; H04N 5/60
[52] U.S. Cl. ..................... 348/571; 348/552; 348/719; 348/734; 348/738; 348/725
[58] Field of Search ............ 358/160, 188, 191.1, 358/194.1, 903, 21 R; 348/552, 571, 708, 714, 718, 719, 720, 725, 728, 729, 731, 734, 738; H04N 5/44, 5/60; 455/186.1, 186.2; 345/200, 193, 190

[56] References Cited

U.S. PATENT DOCUMENTS

| | | | |
|---|---|---|---|
| 4,297,618 | 10/1981 | Spilsbury | 358/73 |
| 4,499,457 | 2/1985 | Hintze | 358/22 |
| 4,656,604 | 4/1987 | Van Loon | 358/903 |
| 4,727,426 | 2/1988 | Itabashi | 358/191.1 |
| 4,731,654 | 3/1988 | Itabashi | 358/188 |
| 4,766,581 | 8/1988 | Korn | 358/342 |
| 4,991,023 | 2/1991 | Nicols | 358/168 |
| 5,083,205 | 1/1992 | Arai | 358/191.1 |

*Primary Examiner*—James J. Groody
*Assistant Examiner*—Sherrie Hsia
*Attorney, Agent, or Firm*—Jay H. Maioli

[57] ABSTRACT

In a system, a non-volatile memory unit 14 into which data representative of various kinds of functions of a monitor apparatus are stored is provided in the monitor apparatus, a control operation is performed on the basis of the data stored in the non-volatile memory unit 14 by a CPU 13, and the non-volatile memory unit 14 into which the data have been stored is loaded in the monitor apparatus during production of the monitor apparatus. Otherwise, after the non-volatile memory unit 14 has been loaded on the monitor apparatus, the data are stored in the loaded memory unit by using an external computer or a remote controller.

20 Claims, 3 Drawing Sheets

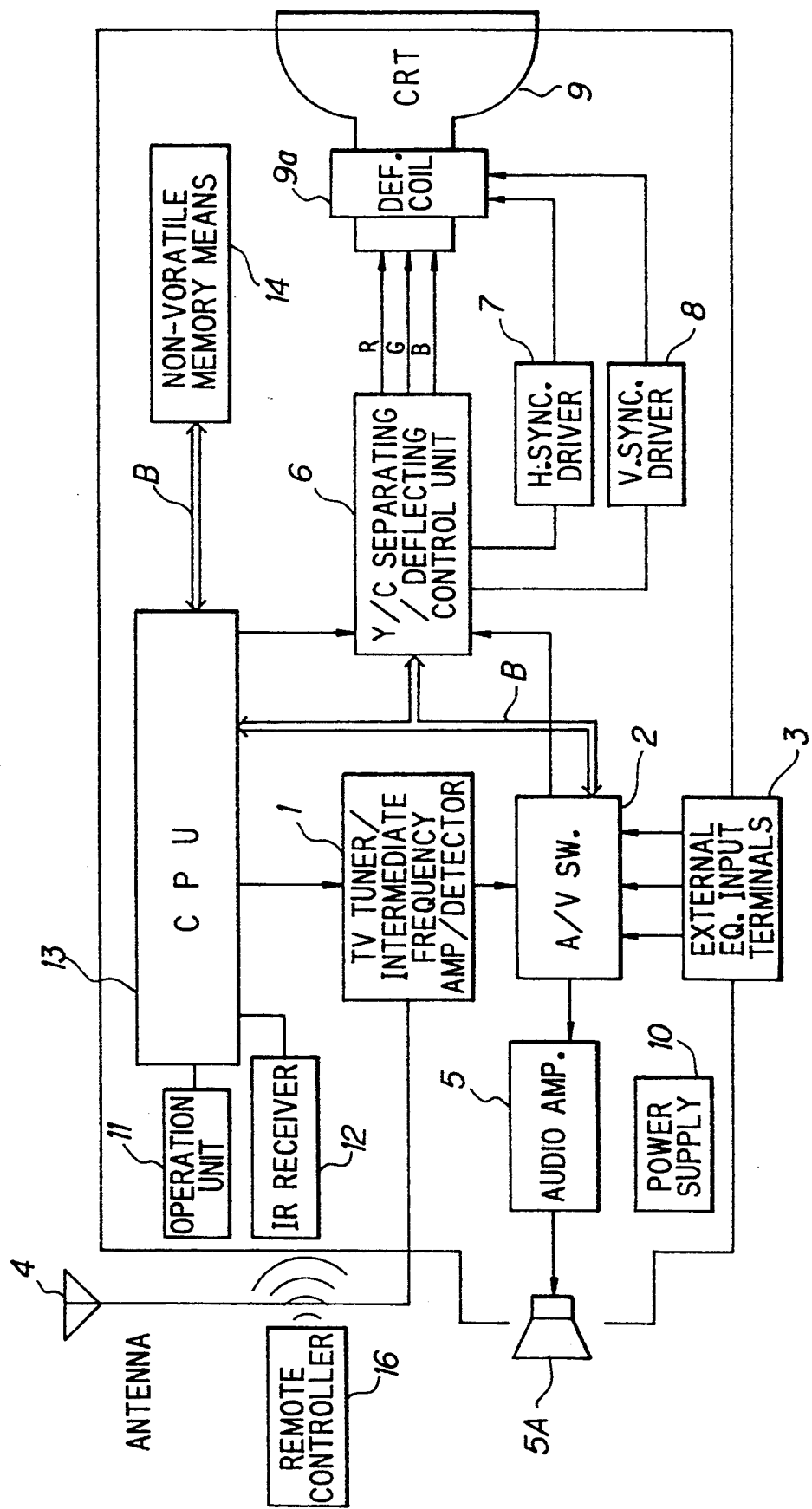

AUDIO VIDEO EQUIPMENT INCLUDING NON-VOLATILE MEMORY MEANS AND METHODS FOR PRODUCING THE SAME

BACKGROUND OF THE INVENTION

The present invention relates to audio video equipment such as a television receiver, a VTR and audio equipment, and it also relates to a method for producing such an audio video equipment.

Recent audio video equipment such as television receivers, VTRs and audio equipment have been often provided with various functions such as a surround function and a so-called picture-in-picture function (PIP).

The different kinds and numbers of such functions to be added to audio video equipment are used therein even if the equipment is made by the same maker. However, to reduce manufacturing costs, it is desirable to use the same type of a control unit such as a microcomputer for executing and controlling the various functions of the equipment.

Accordingly, for instance, Japanese Patent Application Laid-Open No. HEI 3-250233 shows a system in which a control unit judges the different functions of the equipment, i.e., what functions the various circuits of the audio video equipment are designed or manufactured to possibly attain. The control unit carries out operational controls in response to the possible function.

The system includes a function judgement means such that a diode matrix and the like are connected to predetermined ports of the microcomputer and the function judgement is performed in accordance with ON/OFF information of each port. In other words, the CPU of the microcomputer affects the control operation of the given function on the basis of the presence/absence of the functions. Accordingly, even if the possible functions of the equipment are different from each other, the presence/absence of each function of each equipment is thus judged so that the same type of microcomputer may be used as a control means and the same program may be commonly utilized.

However, in the case where electronic components such as diode matrixes are used as the function judgement means, it is necessary to provide the microcomputer with a terminal of an I/O port for each function. Accordingly, the promotion of versatility in the audio video equipment would inevitably lead to the lack of the terminal number of the I/O ports of an microcomputer. For equipment with the increased number of functions, it is necessary to increase the number of I/O ports for the function judgement corresponding to the increased number of functions. As a result, it would be impossible to use the same type of microcomputers and the production cost is unduly increased.

Furthermore, promotion of versatility would also lead to the enlargement of the diode matrix for the function judgement means, resulting in the increased number of the electronic components or the modification thereof. Accordingly, even if the same type of audio video equipment is made by the same maker, a different manufacture line has to be provided in response to a different function. The larger the number of the functions to be set, the larger the number of the manufacture steps will be.

Thus, in the recent tendency to the promotion of versatility and the increased number of the functions of the equipment, the conventional system in which electronic components such as diode matrixes are used for setting the various functions suffers from problems such that the number of the manufacture steps and the number of the manufacture lines would be increased, resulting in complication of the manufacture steps.

SUMMARY OF THE INVENTION

In view of the above-noted defects, an object of the present invention is to provide a system in which a control unit for controlling respective operational functions of audio video equipment and a non-volatile memory unit where data for judging functions able to be attained in the audio video equipment is stored are provided in the audio video equipment, and the control operation of the function is determined on the basis of the data stored in the non-volatile memory unit by the control unit.

In order to attain this and other objects, according to the present invention, there is provided an audio video equipment with a non-volatile memory, comprising: an audio video signal processing unit for processing an audio and/or video signal; a control unit for controlling operation of the audio video signal processing unit; and a non-volatile memory unit for storing control data for the audio video signal processing unit controlled by the control unit.

The audio video signal processing unit comprises an audio video switch for switching the audio and/or video signal and which is being controlled by the control unit.

The control unit comprises a microprocessor which operates by a stored program.

The audio video equipment may comprise: a luminance/chrominance separating circuit for separating luminance/chrominance signals from the audio and/or video signal; a deflection control circuit for generating horizontal and vertical deflection signals; a deflection member for receiving the horizontal and vertical deflection signals from the deflection control circuit; and a display member for receiving the video signal and displaying a picture image.

The deflection member comprises a deflection yoke, and the display member comprises a cathode ray tube.

According to another aspect of the invention, the equipment may further comprise a digital wired bass terminal for reading and/or writing data of the non-volatile memory unit by an external apparatus.

According to still another aspect of the invention, the equipment may further comprise a remote control signal receiving member for receiving a remote control signal transmitted by an external remote controller, wherein the unit is controlled by the signal received by the remote control signal receiving member.

According to the invention, there is also provided a method for producing audio video equipment, comprising the following steps: writing predetermined data in a non-volatile memory unit for controlling a destination apparatus; and attaching the non-volatile memory unit to the destination apparatus.

There is also provided a method for producing audio video equipment, comprising the following steps: attaching a non-volatile memory unit to a destination apparatus; and writing predetermined data in the non-volatile memory unit for controlling the destination apparatus.

In the writing step, the data are transmitted from an external remote controller.

BRIEF DESCRIPTION OF THE DRAWINGS

FIG. 3 is a block diagram of a television receiver on which a non-volatile memory is mounted and in which data is written or changed by using a remote controller according to a third embodiment of the invention.

DESCRIPTION OF THE PREFERRED EMBODIMENTS

A television receiver will now be described in accordance with a first embodiment of the present invention with reference to FIG. 1 and Tables 1 and 2.

Figure 1:
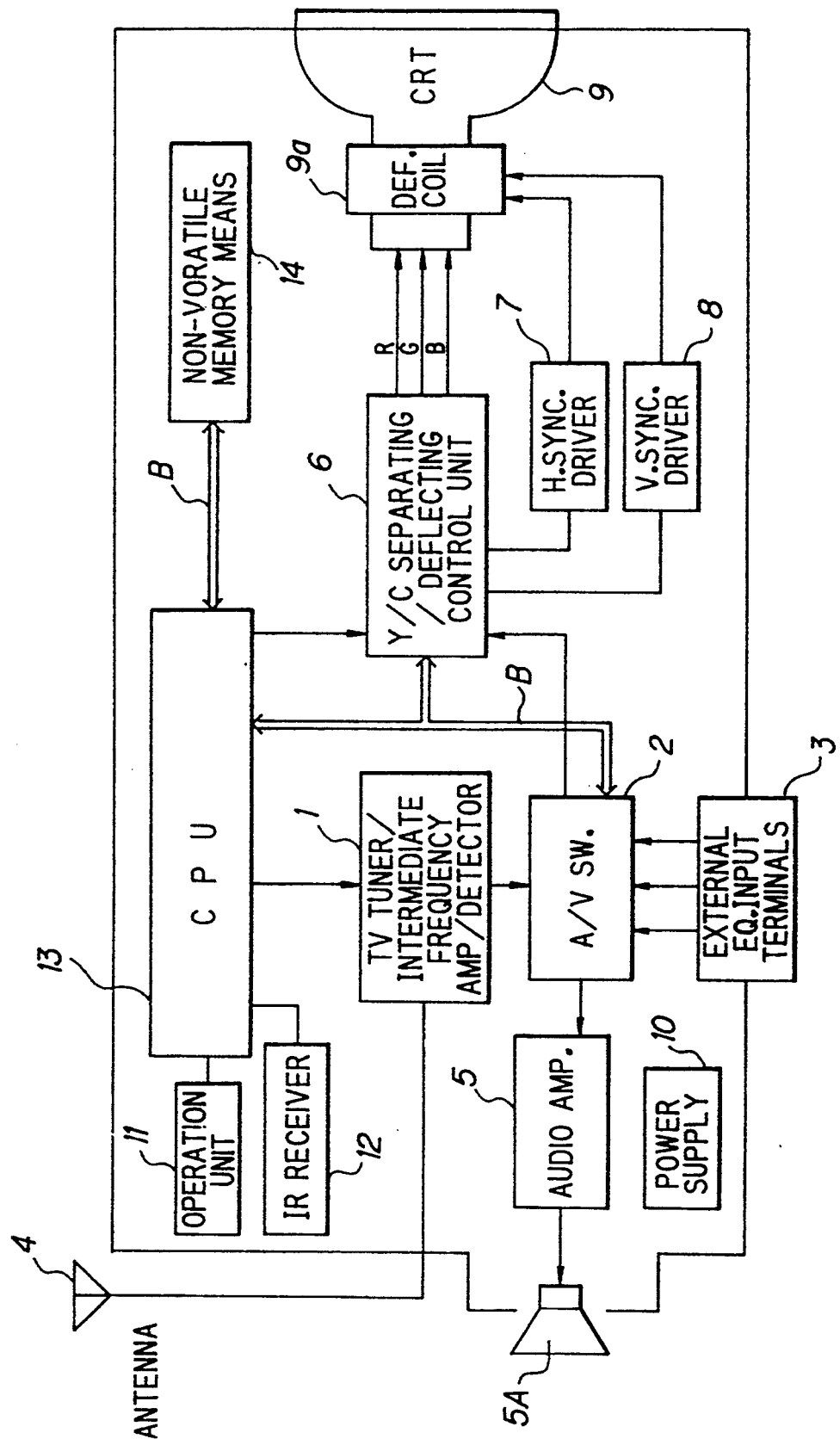
FIG. 1 is a block diagram of a television receiver on which a non-volatile memory is mounted according to a first embodiment of the invention.

FIG. 1 is a block diagram showing a circuitry of a television receiver in accordance with the first embodiment.

The operation of the television receiver according to the embodiment will now be described.

A television broadcasting radio wave received by an antenna 4 is modulated to a desired channel frequency as an intermediate frequency signal by a television tuner/intermediate frequency amplifier/detector 1 and is demodulated to an audio/video signal to be inputted into an A/V switch 2. An audio/video signal from a VTR or an external tuner connected to an external equipment input terminal 3 is also inputted into the A/V switch 2.

A user's desired input source is selected from the audio/video signals, inputted into the A/V switch 2, by user's operation of an operation unit 11 or otherwise by reception of the operation information of an outside remote control apparatus in an infra-red ray receiving means 12 through a switching control of the A/V switch 2 under a CPU 13 on the basis of this information.

The audio signal of the audio/video signal of the thus selected input source is amplified in an audio amplifier 5, and then outputted into loud speakers 5A. Also, the video signal is fed to a Y/C separating/deflecting control unit 6. A luminance signal (i.e., Y signal) and a chrominance signal (i.e., C signal) are separated from the audio signal fed to the Y/C separating/deflecting control unit 6, and further a horizontal synchronous signal and a vertical synchronous signal are derived therefrom.

In the Y/C separating/deflecting control unit 6, a luminance signal processing operation and a chrominance signal processing operation are carried out for the Y signal and C signal, respectively. For instance, an R-Y signal, a G-Y signal and a B-Y signal are fed in an RGB matrix circuit (not shown) provided in the above-described Y/C separating/deflecting control unit 6 to thereby demodulate the respective RGB signals. The respective RGB signals are applied to a CRT 9 and are outputted as electron beams from electron guns.

The horizontal synchronous signal and the vertical synchronous signal derived in the Y/C separating/deflecting control unit 6 are fed to a horizontal synchronous driver 7 and a vertical synchronous driver 8, respectively, to thereby output a horizontal deflecting current and a vertical deflecting current of the electron beams during the respective picture image scanning to be applied to a deflector coil 9a mounted on the CRT 9. Thus, the input video image from the external equipment or the received television video image is displayed on the picture field of the CRT 9. Reference numeral 10 denotes a power source.

The features of this embodiment will now be explained.

In this embodiment, as shown in FIG. 1, a non-volatile memory means 14 is provided within the television receiver and is connected with the CPU 13 through a bus line B.

The non-volatile memory used in the means 14 has such a feature that it has a RAM function but its stored data are held without volatilization even after the power supply has been turned off. It is possible to use, for example, EP-ROM, EEP-ROM, UVEP-ROM and the like as the memory. These ROMs are generally called as NVRAMs.

In the embodiment shown, the data representative of the presence/absence of the functions to be set in the actual television sets in response to the type of the TV sets in the various functions to be possibly added to the TV sets are stored in the non-volatile memory means 14. In the first embodiment, the non-volatile memory means 14 into which these data are stored in advance is actually loaded in the TV receiver body during the manufacturing process.

Table 1 is an address map of the non-volatile memory means 14 according to this embodiment. In this case, the kinds of the functions able to be added to the TV sets correspond to third to eighth bits in first to fourth rows (addresses L1 to L4), respectively.

Incidentally, all the bits of an address L5 and the second bits of the respective addresses L1 to L4 are kept blank. In the case where further functions are provided, it is possible to make these blanks correspond to the new functions.

Also, all the bits of the address L6 and the first bits of all the respective addresses are used as parity bits for error-judgement of data read out from the non-volatile memory means 14 by the CPU 13.

In order to select and set the function corresponding to the actual type among the various functions able to be added to the television receiver, as shown in the illustration of the various functions in Table 2, data "0" or "1" is given and stored corresponding to the address to which the functions in the non-volatile memory means 14 correspond, respectively.

Namely, as shown in Table 2, a data character of "1" written in the memory means as 14, corresponding to one of the respective functions able to be added to the TV set stands for the TV set having the function, whereas a data character of "0" written in the memory means stands for the TV set not having the function.

For instance, in the TV set in accordance with the embodiment, if two video input terminals are physically provided, the number of video input functions needed is two. Data "1" are stored in the seventh and eighth bits of the address L1 of Table 1 corresponding to the video inputs 1 and 2. Data "0" are stored in the sixth bit of the address corresponding to the video input 3. This means that the non-volatile memory means 14 stores the fact that the TV set has the video input functions 1 and 2 because data "1" is written therein for the video input functions 1 and 2 and no video input function 3 because data "0" is written therein for the video input function 3.

The non-volatile memory means 14 stored as data representative of the presence/absence of the respective data is prepared in advance, and is actually loaded on substrates of the television sets.

During the television set operation, the above-described data is read out through the bus line B from the non-volatile memory means 14 by the CPU 13.

Thus, the CPU judges that the television set has the video input functions 1 and 2 and carries out the corresponding control operation.

With such an arrangement, all the transfer of the data for function judgement may be effected through the bus line B, and hence, it is unnecessary to use any electronic component such as a diode matrix as the function judgement means. Accordingly, it is unnecessary to provide the I/O ports corresponding to the respective functions for function judgement.

As the number of the I/O ports needed for the function judgement is reduced, the remaining I/O ports may be allotted to the other control operations.

Since the presence/absence of the function is judged only by the non-volatile memory means 14, even in the case where a different functioning setting is effected in accordance with each type of function or a new function is added to the product, it is sufficient to prepare, in advance, the non-volatile memory means 14 where the stored content is rewritten.

It is therefore possible to commonly use components to be loaded on substrates within the TV set or to be actually loaded on substrates. A possible smallest modification such as component change is only applied to the articles for the addition of the function, and it is possible to suppress the change of the basic portion of the article to a minimal extent.

A second embodiment of the invention will now be described with reference to FIG. 2.

Figure 2:
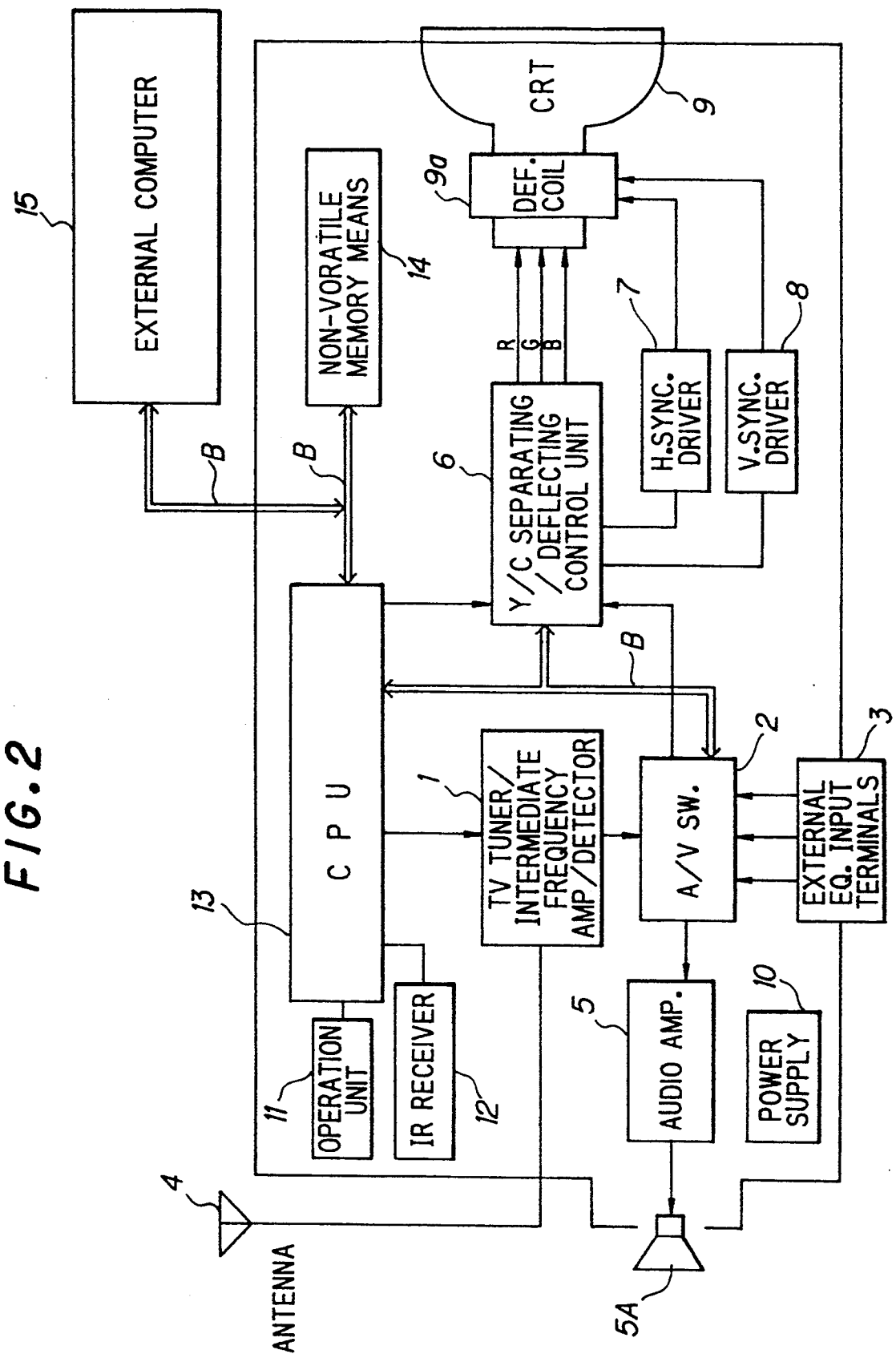
FIG. 2 is a block diagram of a television receiver on which a non-volatile memory to be controlled by an external computer is mounted according to a second embodiment of the invention.

As shown in FIG. 2, the CPU 13 and the non-volatile memory means 14 are connected to each other-through the bus line B. The second embodiment is characterized by the following arrangement. Namely, after the non-volatile memory means 14 has been actually loaded on the substrate of the TV receiver in advance, an external computer 15 is connected to the bus line B within the TV receiver for a manufacture method for typically writing the data into the non-volatile memory means 14.

In this case, in addition to the advantage of the first embodiment, it is possible to simultaneously carry out confirmation of the data written in the non-volatile memory means, or to carry out a rewriting operation such as correction of the data during the data writing process.

A third embodiment of the invention will now be described.

As shown in FIG. 3, in the third embodiment, instead of the external computer used in the second embodiment, a remote control apparatus 16 is used.

In this case, function judgement information and the like emitted as infra-red signals from the remote control apparatus 16 are detected by an infra-red ray receiving means 12 provided in the TV receiver and are fed to the CPU 13. Then, the CPU 13 controls such an operation that the data writing or rewriting is executed in the non-volatile memory means 14 which has already be loaded on the substrate within the TV receiver.

In this case, if the information such as control operation and written data are displayed on the picture display of the CRT, it is possible for operators to enhance the writing working characteristic for the function judgement information.

Also, in the third embodiment, it is possible to ensure the same effect as the first embodiment. The third embodiment is advantageous in as much as a connection for connecting the TV receiver and the external input instrument during the data writing operation may be dispensed with. Also, this system is effective not only on the manufacturing process but also on the adjustment in the repair work and confirmation of the data.

It is apparent that the present invention is not limited to the above-described specific embodiments and the invention may be applied to, for example, VTR instruments, audio systems and any other audio video equipment. Furthermore, it is possible to apply the invention to various electronic equipment such as telephones that have been recently developed with high versatility.

As described above, according to the present invention, the non-volatile memory means 14 where the absence/presence of the data for various functions has been stored is provided within the audio video instrument, and the CPU of the audio video instrument determines the control operation on the basis of the data stored in the non-volatile memory means 14.

The data of the functions are transferred through the bus line. Accordingly, it is unnecessary to provide I/O ports whose number corresponds to the number of kinds of the functions. It is thus possible to commonly use the control means (microcomputer) for various kinds of the products.

Also, in a method for manufacturing the audio video equipment, the non-volatile memory means 14 where the data for judging the function have been loaded in advance is loaded in the audio video equipment, or otherwise the data for judging the function are stored by an external computer or a remote control apparatus in the non-volatile memory means which has been mounted in the audio video equipment. Accordingly, even in the case where a different function is set for each type of the equipment or a new function is added to products, it is possible to cope with the change simply by rewriting the stored content of the non-volatile memory means.

It is possible to commonly use non-volatile memories as a microcomputer and a function judgement means which have been actually loaded in the audio video equipment. Accordingly, even among different types of equipment, it is possible to commonly use the manufacture process and the production line, advantageously, which would lead to the decreased cost of production.

TABLE 1

|    | 8th bit | 7th bit | 6th bit | 5th bit | 4th bit | 3rd bit | 2nd bit | 1st bit |
|----|---------|---------|---------|---------|---------|---------|---------|---------|
| L1 | video input 1 | video input 2 | video input 3 | S video input 1 | S video input 2 | S video input 3 | | |
| L2 | monoral/ stereo | speaker switch | French subtitle display | balance | treble/ bass adjustment | surround | | |
| L3 | infra-red | Spanish | Portuguese | input | digital | FM radio | | |

TABLE 1-continued

| | 8th bit | 7th bit | 6th bit | 5th bit | 4th bit | 3rd bit | 2nd bit | 1st bit |
|---|---|---|---|---|---|---|---|---|
| L4 | headphone one subpicture display | subtitle display two subpicture display | subtitle display English subtitle display | memory function TV tuner | signal processor antenna switch | antenna switch for subpicture | | |
| L5 | | | | | | | | |
| L6 | | | | | | | | |

TABLE 2

| Items/Data | 0 | 1 |
|---|---|---|
| Video inputs 1 to 3 | no video input | yes |
| S video inputs 1 to 3 | no S video input | yes |
| TV tuner | no TV tuner | yes |
| Speaker switch | no speaker switch | yes |
| Balance | user operation disable | user operation enable |
| Treble/bass adjustment | not accessible by user | accessible by user |
| Surround | not selected | selected |
| Monoral/stereo | monoral model | stereo available |
| Spanish subtitle display | none | yes |
| Input memory function | none | yes |
| infra-red ray display | not using | using |
| One subpicture display | none | yes |
| Two subpicture display | none | yes |
| Antenna switch | none | yes |
| Antenna switch for subpicture | none | yes |
| French subtitle display | none | yes |
| Portuguese subtitle display | none | yes |
| English subtitle display | none | yes |
| Digital signal processor | not available | available |
| FM radio | none | yes |

What is claimed is:

1. Audio video equipment, comprising:
an audio video signal processing unit for processing one of an audio signal and a video signal;
a control unit for controlling an operation of said audio video signal processing unit; and
a non-volatile memory unit for storing control data to be supplied to said control unit for controlling said audio video signal processing unit, wherein said control data corresponds to a presence or an absence of inherent operational functions of the audio video equipment.

2. The equipment according to claim 1, wherein said audio video signal processing unit comprises an audio video switch for switching one of the audio signal and the video signal, said switch being controlled by said control unit.

3. The equipment according to claim 2, wherein said control unit comprises a microprocessor operated according to a program stored in said non-volatile memory unit.

4. The equipment according to claim 3, further comprising:
a luminance/chrominance separating circuit for separating luminance and chrominance signals from said video signal;
a deflection control circuit for generating horizontal and vertical deflection signals;
a deflection member for receiving the horizontal and the vertical deflection signals from said deflection control circuit; and
a display member for receiving the video signal and displaying a picture image.

5. The equipment according to claim 4, wherein said deflection member comprises a deflection yoke, and said display member comprises a cathode ray tube.

6. The equipment according to claim 4, further comprising:
an audio amplifying member for amplifying the audio signal; and
a loud speaker member for converting the audio signal from said audio amplifying member to a sound wave.

7. The equipment according to claim 6, further comprising a tuner member for receiving a radio frequency signal and generating a base band video signal and a base band audio signal.

8. The equipment according to claim 1, further comprising a digital wired bass terminal for connection with an external apparatus for performing one of reading and writing data of said non-volatile memory unit.

9. The equipment according to claim 8, wherein said audio video signal processing unit comprises an audio video switch for switching one of the audio signal and the video signal, said switch being controlled by said control unit.

10. The equipment according to claim 9, wherein said control unit comprises a microprocessor operated according to a program stored in said non-volatile memory unit.

11. The equipment according to claim 10, further comprising:
a luminance/chrominance separating circuit for separating luminance and chrominance signals from said video signal;
a deflection control circuit for generating horizontal and vertical deflection signals;
a deflection member for receiving the horizontal and the vertical deflection signals from said deflection control circuit; and
a display member for receiving the video signal and displaying a picture image.

12. The equipment according to claim 11, wherein said deflection member comprises a deflection yoke, and said display member comprises a cathode ray tube.

13. The equipment according to claim 1, further comprising a remote control signal receiving member for receiving a remote control signal transmitted by an external remote controller, wherein said non-volatile memory unit is controlled by the signal received from said remote control signal receiving member.

14. The equipment according to claim 13, wherein said audio video signal processing unit comprises an audio video switch for switching one of the audio signal and the video signal, said switch being controlled by said control unit.

15. The equipment according to claim 14, wherein said control unit comprises a microprocessor operated according to a program stored in said non-volatile memory unit.

16. The equipment according to claim 15, further comprising:

a luminance/chrominance separating circuit for separating luminance and chrominance signals from said video signal;

a deflection control circuit for generating horizontal and vertical deflection signals;

a deflection member for receiving the horizontal and the vertical deflection signals from said deflection control circuit; and a display member for receiving the video signal and displaying a picture image.

17. The equipment according to claim 16, wherein said deflection member comprises a deflection yoke, and said display member comprises a cathode ray tube.

18. A method for producing audio video equipment comprising the following steps:

writing predetermined data corresponding to a presence or an absence of inherent operational functions of a destination apparatus in a non-volatile memory unit for controlling said destination apparatus; and attaching said non-volatile memory unit to said destination apparatus after said writing.

19. A method for producing audio video equipment, comprising the following steps:

attaching a non-volatile memory unit to a destination apparatus; and writing predetermined data corresponding to a presence or an absence of inherent operational functions of said destination apparatus in said non-volatile memory unit after said attaching for controlling said destination apparatus.

20. The method according to claim 19, wherein, in said writing step, said data are transmitted from an external remote controller.

* * * * *